(12) United States Patent
Sueyoshi

(10) Patent No.: US 7,808,726 B2
(45) Date of Patent: Oct. 5, 2010

(54) IMAGE CAPTURE LENS AND IMAGE CAPTURE APPARATUS

(75) Inventor: Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 12/379,823

(22) Filed: Mar. 3, 2009

(65) Prior Publication Data

US 2009/0225445 A1    Sep. 10, 2009

(30) Foreign Application Priority Data

Mar. 5, 2008    (JP) ................ 2008-055178

(51) Int. Cl.
*G02B 9/04*    (2006.01)
*G02B 13/16*    (2006.01)

(52) U.S. Cl. .................. 359/795; 359/793; 348/335

(58) Field of Classification Search .......... 359/753, 359/754, 793, 795; 348/335
See application file for complete search history.

(56) References Cited

U.S. PATENT DOCUMENTS 4,986,643 A * 1/1991 Moriyama ............ 359/693
5,402,268 A * 3/1995 Tatsuno ............... 359/747
5,623,371 A * 4/1997 Hankawa ............. 359/693
6,747,817 B2 * 6/2004 Takato ................. 359/794
7,706,087 B2 * 4/2010 Obama ................. 359/794

FOREIGN PATENT DOCUMENTS

| JP | 62-195617 | 8/1987 |
| JP | 63-247713 | 10/1988 |
| JP | 2005-189727 | 7/2005 |

* cited by examiner

*Primary Examiner*—David N Spector
(74) *Attorney, Agent, or Firm*—Rader, Fishman & Grauer PLLC

(57) ABSTRACT

An image capture lens includes: when changed from infinity to close focusing, a first lens group moving from an image to an object with positive refractive power; and a second lens group fixed relatively to the image with negative refractive power, wherein the first lens group includes a negative first lens having a strong concave surface facing the image, the second lens group includes one negative lens having a strong concave surface facing the image or a negative cemented lens including positive and negative lenses, and conditional expressions; $0.7 < f1/fi < 0.9$, $1.0 < bf/fi < 1.4$, $0.5 < Rf2/Rr2 < 1$ are satisfied where fi: overall focal length, f1: first-lens-group focal length, bf: overall back focus, Rf2: radius of curvature of the image-side surface of the lens nearest to the object, and Rr2: radius of curvature of the surface nearest to the image of the second lens group.

4 Claims, 7 Drawing Sheets

IMAGE CAPTURE LENS AND IMAGE CAPTURE APPARATUS

CROSS REFERENCES TO RELATED APPLICATIONS

The present invention contains subject matter related to Japanese Patent Application JP 2008-055178 filed in the Japanese Patent Office on Mar. 5, 2008, the entire contents of which are incorporated herein by reference.

BACKGROUND OF THE INVENTION

1. Field of the Invention

The present invention relates to image capture lenses and image capture apparatuses. For example, the present is suitably applied to a macro lens which is used for an interchangeable-lens camera and a digital still camera.

2. Description of the Related Art

To date, a macro lens has been a versatile lens capable of close-up shooting at an extremely close position to a subject, and at the same time, capable of shooting at infinity in the same manner as a normal lens. In general, it is desirable for the macro lens to have been subjected to favorable aberration correction both for closest-up focusing and for infinity focusing.

In order to meet this demand, a so-called floating mechanism, in which at least two lens groups are independently moved for focusing, is often employed. Thus, macro lenses which enable a wide range of shooing, for example, from shooting at infinity to life-size shooting, have been provided (for example, Japanese Unexamined Patent Application Publication Nos. 62-195617 and 63-247713). At the same time, a macro lens having a retrofocus front-lens group has also been proposed (for example, Japanese Unexamined Patent Application Publication No. 2005-189727).

Also, in recent years, digital still cameras having an image size of a 35-mm film and using an imaging device, such as a CCD (Charge Coupled Device), etc., which is smaller than that image size, have been used.

In this case, since an imaging device, such as a small CCD, etc., is used in a digital still camera, it is necessary to employ a lens with a short focal length in order to obtain the same angle of view as that of a 35-mm film. However, when a main unit of a camera has the same configuration and size, even if the focal length is shortened, it becomes necessary to have a relatively long back focus in the same manner as before.

However, a macro lens employing a floating mechanism is often based on a so-called Gaussian lens having symmetrical arrangement of lens elements in a front-rear direction. Thus, the focal length is not made short with respect to the back focus.

Also, further miniaturization is demanded for digital still cameras. In a floating method, in which two lens groups or more are to be moved, it is necessary to regulate movement tracks of individual lens groups by cams. Accordingly, the structure thereof becomes complicated, and thus the method is not well suited for miniaturization and weight saving.

SUMMARY OF THE INVENTION

Although the macro lenses disclosed in the above-described Japanese Unexamined Patent Application Publication Nos. 62-195617 and 63-247713 employ a floating method, there is a problem in that if the amount of movement of a lens group becomes large, the total length of the lenses increases.

In general, a retrofocus lens is often employed in order to shorten a focal length. In the retrofocus macro lens, which has been disclosed in Japanese Unexamined Patent Application Publication No. 2005-189727, back focus is not long enough with respect to the focal length. Accordingly, there is no other choice but to extend a focal length in order to obtain sufficiently long back focus for an imaging device having a small image size. There has been a problem in that it is difficult to obtain a sufficient angle of view as a result.

Further, in the floating-method macro lenses, which have been disclosed in Japanese Unexamined Patent Application Publication Nos. 62-195617, 63-247713, and 2005-189727, in which two lens groups or more are to be moved, it is necessary to regulate movement tracks of individual lens groups by cams. Accordingly, there has been a problem in that the structure thereof becomes complicated, and thus the method is not well suited for miniaturization and weight saving.

The present invention has been made in view of the above points. It is desirable to propose an image capture lens with a short total length and having a barrel structure in which a displacement of a front lens group near an object is reduced. Also, the image capture lens should have excellent compactness, portability, and optical performance. Moreover, it is desirable to propose an image capture apparatus using the above-described image capture lens.

According to an embodiment of the present invention, there is provided an image capture lens including: when focus is changed from infinity focusing to close focusing, a first lens group moving from an image surface side to an object side and having positive refractive power; and a second lens group fixed relatively to the image surface and having negative refractive power, wherein the first lens group includes a negative first lens having a strong concave surface facing to the image side at a nearest side to the object, the second lens group includes one negative lens having a strong concave surface facing to the image side or a negative cemented lens including a positive lens and a negative lens, and the image capture lens satisfies conditional expressions (1), (2), and (3); $0.7<f1/fi<0.9$ (1) $1.0<bf/fi<1.4$ (2) $0.5<Rf2/Rr2<1$ (3) where fi is a focal length of the overall lens system, f1 is a focal length of the first lens group, bf is a back focus of the overall lens system, Rf2 is a radius of curvature of the image side surface of the lens disposed at the nearest side to the object of the first lens group, and Rr2 is a radius of curvature of the surface nearest to the image side of the second lens group.

In this image capture lens, the conditional expression (1) specifies a lateral magnification of the second lens group, which is a rear group, in order to control a displacement of the first lens group, which is a front group. If the magnification is less than the lower limit, the focal length of the first lens group becomes too short, and thus it becomes not possible to ensure sufficient back focus. Also, fluctuations of spherical aberration with respect to a change in a subject distance become large, and thus imaging performance in close region deteriorates. On the other hand, if the magnification is greater than the upper limit, the displacement of the first lens group becomes large, and thus it becomes difficult to miniaturize the barrel.

Also, in the image capture lens, the conditional expression (2) specifies the ratio of the amount of back focus to the focal length. If the ratio is less than the lower limit, the focal length of the total lens system at infinity focusing time becomes long, a displacement of the first lens group at close focusing time becomes large, and thus miniaturization becomes difficult. On the other hand, if the ratio is greater than the upper limit, negative refractive power of the first lens in the first lens group becomes strong, and thus fluctuations of spherical aberration with respect to a change in a subject distance become large. Accordingly, imaging performance in close region deteriorates.

Further, in the image capture lens, the conditional expression (3) specifies the ratio between a radius of curvature of a surface facing to the image side of the negative first lens located nearest to the object in the first lens group and a radius of curvature of a surface nearest to the image side in the second lens group. If the ratio is less than the lower limit, the negative refractive power of the first lens in the first lens group becomes strong, and thus fluctuations of spherical aberration with respect to a change in a subject distance becomes large. On the other hand, if the ratio is greater than the upper limit, correction of the curvature of the image surface by the surface nearest to the image side in the second lens group becomes weak, and thus the positive curvature of the image surface at close focusing time on the subject becomes strong.

Accordingly, it becomes possible for the image capture lens to improve compactness and portability by employing a simplified barrel structure in which only the first lens group is moved and the second lens group is fixed. At the same time, by satisfying the conditional expressions (1) to (3), the image capture lens has a relatively short focal length compared to the back focus, and can reduce a displacement of the first lens group and shorten the total length of the lens while having excellent optical performance in a wide range of shooting distance from infinity to unity magnification.

Also, according to another embodiment of the present invention, there is provided an image capture apparatus including: an image capture lens; and an imaging device converting an optical image formed by the image capture lens into an electrical signal, wherein the image capture lens includes; when focus is changed from infinity focusing to close focusing, a first lens group moving from an image surface side to an object side and having positive refractive power; and a second lens group fixed relatively to the image surface and having negative refractive power, wherein the first lens group includes a negative first lens having a strong concave surface facing to the image side at a nearest side to the object, the second lens group includes one negative lens having a strong concave surface facing to the image side or a negative cemented lens including a positive lens and a negative lens, and the image capture lens satisfies conditional expressions (1), (2), and (3); $0.7<f1/fi<0.9$ (1) $1.0<bf/fi<1.4$ (2) $0.5<Rf2/Rr2<1$ (3) where fi is a focal length of the overall lens system, f1 is a focal length of the first lens group, bf is a back focus of the overall lens system, Rf2 is a radius of curvature of the image side surface of the lens disposed at the nearest side to the object of the first lens group, and Rr2 is a radius of curvature of the surface nearest to the image side of the second lens group.

In the image capture lens of the image capture apparatus, the conditional expression (1) specifies a lateral magnification of the second lens group, which is a rear group, in order to control a displacement of the first lens group, which is a front group. If the magnification is less than the lower limit, the focal length of the first lens group becomes too short, and thus it becomes not possible to ensure sufficient back focus. Also, fluctuations of spherical aberration with respect to a change in a subject distance become large, and thus imaging performance in close region deteriorates. On the other hand, if the magnification is greater than the upper limit, the displacement of the first lens group becomes large, and thus it becomes difficult to miniaturize the barrel.

Also, in the image capture lens of the image capture apparatus, the conditional expression (2) specifies the ratio of the amount of back focus to the focal length. If the ratio is less than the lower limit, the focal length of the total lens system at infinity focusing time becomes long, and a displacement of the first lens group at close focusing time becomes large, and thus miniaturization becomes difficult. On the other hand, if the ratio is greater than the upper limit, negative refractive power of the first lens in the first lens group becomes strong, and thus fluctuations of spherical aberration with respect to a change in a subject distance become large. Accordingly, imaging performance in close region deteriorates.

Further, in the image capture lens of the image capture apparatus, the conditional expression (3) specifies the ratio between a radius of curvature of a surface facing to the image side of the negative first lens located nearest to the object in the first lens group and a radius of curvature of a surface nearest to the image side in the second lens group. If the ratio is less than the lower limit, the negative refractive power of the first lens in the first lens group becomes strong, and thus fluctuations of spherical aberration with respect to a change in a subject distance becomes large. On the other hand, if the ratio is greater than the upper limit, correction of the curvature of the image surface by the surface nearest to the image in the second lens group becomes weak, and thus the positive curvature of the image surface at close focusing time on the subject becomes strong.

Accordingly, it becomes possible for the image capture lens of the image capture apparatus to improve compactness and portability by employing a simplified barrel structure in which only the first lens group is moved and the second lens group is fixed. At the same time, by satisfying the conditional expressions (1) to (3), the image capture lens has a relatively short focal length compared to the back focus, and can reduce a displacement of the first lens group and shorten the total length of the lens while having excellent optical performance in a wide range of shooting distance from infinity to unity magnification.

By the present invention, it becomes possible to improve compactness and portability by employing a simplified barrel structure in which only the first lens group is moved and the second lens group is fixed. At the same time, by satisfying the conditional expressions (1) to (3), the image capture lens has a relatively short focal length compared to the back focus, and can reduce a displacement of the first lens group and shorten the total length of the lens while having excellent optical performance in a wide range of shooting distance from infinity to unity magnification. Thus, it is possible to achieve an image capture lens with a short total length and having a barrel structure in which a displacement of a front lens group near an object is reduced. Also, the image capture lens has excellent compactness, portability, and optical performance. Moreover, it is possible to achieve an image capture apparatus using the above-described image capture lens.

DESCRIPTION OF THE PREFERRED EMBODIMENTS

In the following, detailed descriptions will be given of embodiments of the present invention with reference to the drawings.

1. First Embodiment

Figure 1:
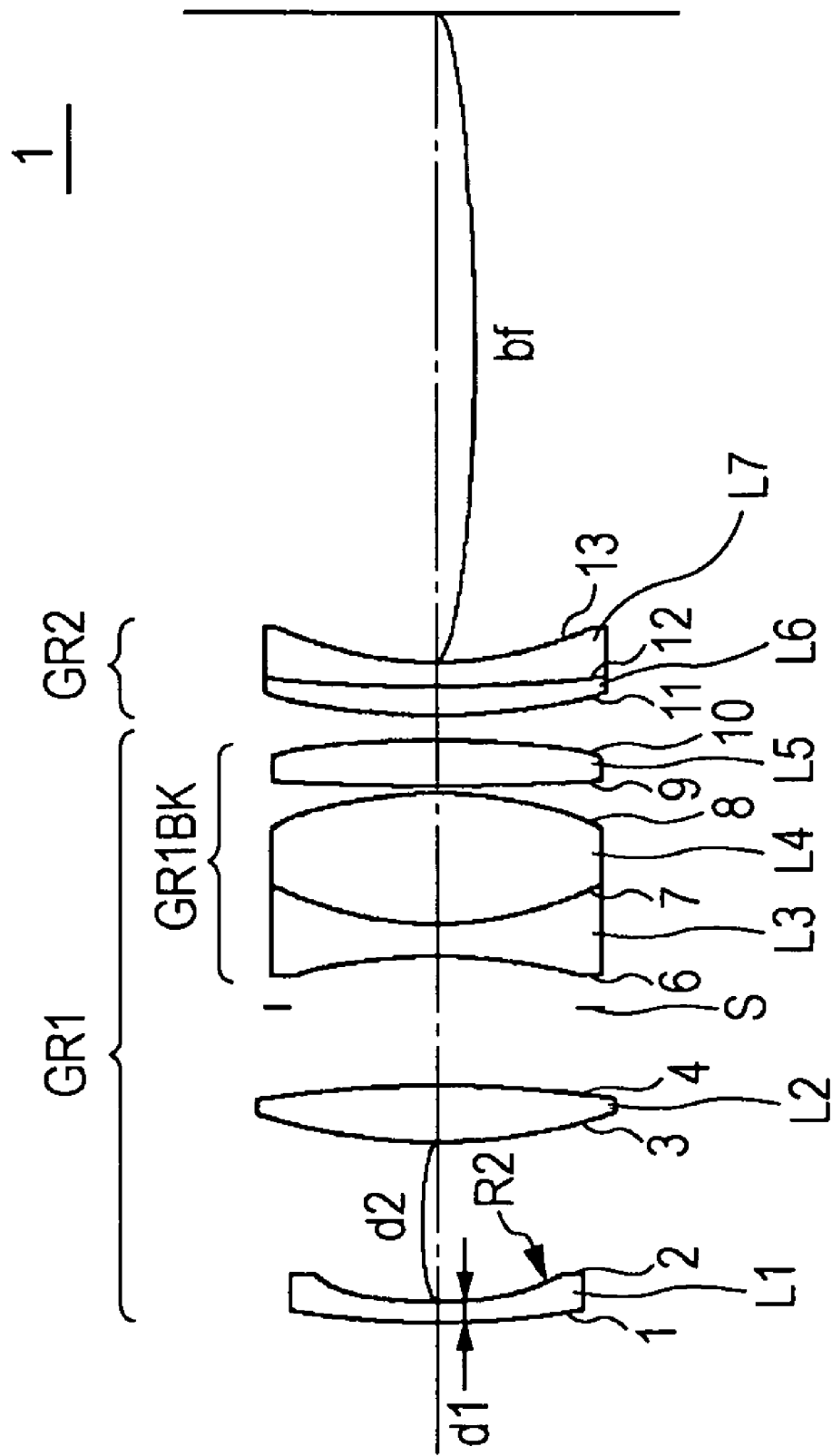
FIG. 1 is a schematic sectional view illustrating a configuration of an image capture lens according to a first embodiment.

In FIG. 1, reference numeral 1 denotes a retrofocus image capture lens (macro lens) according to a first embodiment as a whole. The image capture lens includes, in order from an object side, a first lens group GR1, which is movable along an optical axis and has positive refractive power, and a fixed second lens group GR2 having negative refractive power.

In the image capture lens 1, focusing is performed by moving the first lens group GR1 along the optical axis. When focusing is changed from infinity focusing to close-up focusing, the first lens group GR1 having positive refractive power is moved from an image surface side to the object side.

That is to say, the image capture lens 1 employs an asymmetric (retrofocus) lens system in which the first lens group GR1, which is near to the object side, is moved along the optical axis, whereas the second lens group GR2, which is near to the image side, is fixed. Thereby, it is possible to make the back focus longer than a focal length of the total lens system.

The first lens group GR1 includes, in order from the object side, a first lens L1, which is a meniscus lens with negative refractive power and has a convex surface facing to the object side, a second lens L2 having positive refractive power, and a rear group GR1BK of the first lens group including a third lens L3 with negative refractive power and having a concave surface facing to the object side with sandwiching an aperture S.

The rear group GR1BK of the first lens group includes the third lens L3 having negative refractive power, a fourth lens L4 cemented with the third lens L3 and having positive refracting power, and a fifth lens L5 having positive refracting power.

The second lens group GR2 is fixed at that position, and includes a sixth lens L6 having positive refracting power, and a seventh lens L7, which is cemented with the sixth lens L6, and has negative refractive power and a strong concave surface facing to the image side.

In the image capture lens 1, the negative first lens L1 having the convex surface facing to the object side of the first lens group GR1 has a strong concave surface facing to the image side, and thus the amount of change in the spherical aberration becomes small with respect to a change in the incident light height to the first lens L1 from infinity shooting time to close-up shooting time. Thereby, in the image capture lens 1, fluctuations of spherical aberration of the first lens group GR1 are made small from infinity shooting time to close-up shooting time.

At the same time, in the image capture lens 1, the second lens group GR2 is fixed relatively to the image surface, and thus an amount of generated spherical aberration is substantially constant from infinity shooting time to close-up shooting time. As described above, fluctuations of spherical aberration of the first lens group GR1 are made small from infinity shooting time to close-up shooting time, and thus fluctuations of spherical aberration of the total lens system are made small.

Also, the second lens group GR2 includes the seventh lens L7 having a strong concave surface facing to the image surface, and thus the second lens group GR2 generates strong positive distortion. Thereby, the image capture lens 1 corrects negative distortion generated by the negative first lens L1 having the convex surface facing to the object side of the first lens group GR1, and thus distortion of the total lens system are made small.

In this manner, with the lens element configuration as described above, the image capture lens 1 is allowed to ensure sufficient back focus bf1 even though the focal length is kept small. Also, the image capture lens 1 has a simple structure in which only the first lens group GR1 is moved while the second lens group. GR2 is fixed. Accordingly, it becomes possible to simplify a displacing mechanism, and thus to reduce load at focusing time.

Table 1 shows various specification values of a numerical example 1, in which specific values are applied to the first lens L1 and the second lens L2 in the first lens group GR1 of the image capture lens 1, the third lens L3, the fourth lens L4 and the fifth lens L5 in the rear group GR1BK of the first lens group, and the sixth lens L6 and the seventh lens L7 in the second lens group GR2.

TABLE 1

SPECIFICATIONS OF NUMERICAL EXAMPLE 1
FNo. = 2.878 f = 36.05 ω = 21.51°

| SURFACE No. | R | d | nd | vd |
|---|---|---|---|---|
| 1 | 48.89355 | 1.117 | 1.83483 | 42.72 |
| 2 | 14.84912 | 9.753 | | |
| 3 | 27.61959 | 3.6 | 1.90366 | 31.32 |
| 4 | −56.02352 | 4.909 | | |
| 5 | APERTURE | 3.099 | | |
| 6 | −26.79467 | 2.0 | 1.84666 | 23.78 |
| 7 | 19.62647 | 8.104 | 1.48449 | 70.44 |
| 8 | −19.67172 | 0.3 | | |
| 9 | 119.69735 | 2.8 | 1.83400 | 37.34 |
| 10 | −43.16307 | 1.6~21.6 | | |
| 11 | 37.98243 | 2.0 | 1.84666 | 23.78 |
| 12 | 109.00939 | 1.1 | 1.62004 | 36.30 |
| 13 | 20.07396 | | | |

In Table 1, Fno. denotes an F-number, f denotes a focal length, ω denotes a half angle of view. Also, Surface No.

denotes the i-th surface from the object side, R denotes a radius of curvature of the i-th surface, d denotes a distance between lens surfaces, nd denotes refractive power of a glass member having the i-th surface at the object side with respect to d-line (λ=587.6 nm), and vd denotes an Abbe number of a glass member having the i-th surface at the object side with respect to the d-line.

In this regard, for example, a distance d1 (FIG. 1) between lens between the lens surfaces of the first lens L1, that is to say, the thickness thereof, and d2 denotes a distance between a surface 2 of the first lens L1 and a surface 3 of the second lens L2. In a place where the distance d between surfaces changes by focusing (in this case, a distance d10 between lens surfaces), the values are shown in order of infinity focusing and unity magnification focusing.

Figure 2:
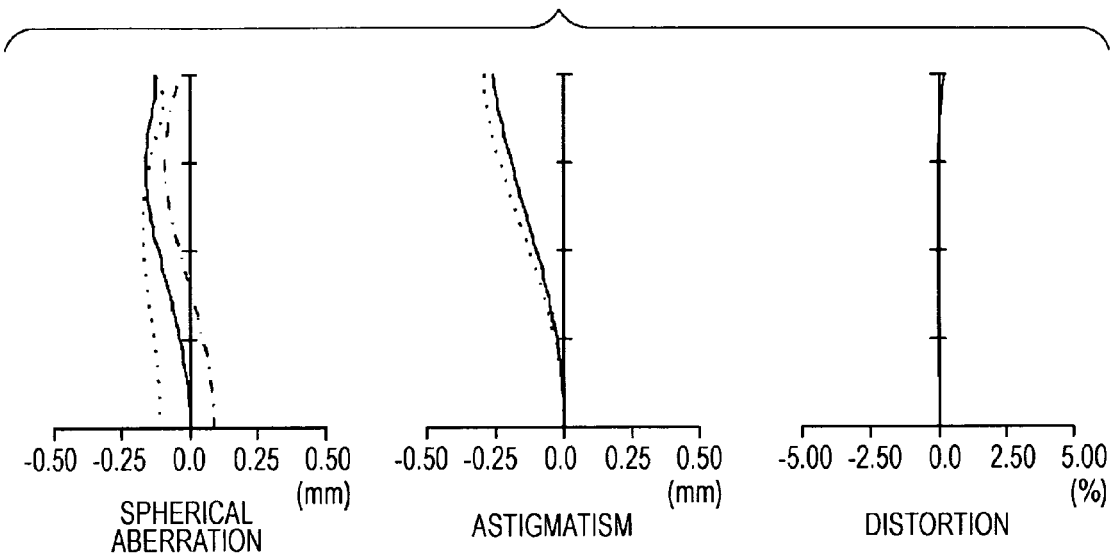
FIG. 2 is a schematic diagram illustrating various aberrations of a numerical example 1, at infinity focusing time, of the image capture lens according to the first embodiment.
Figure 3:
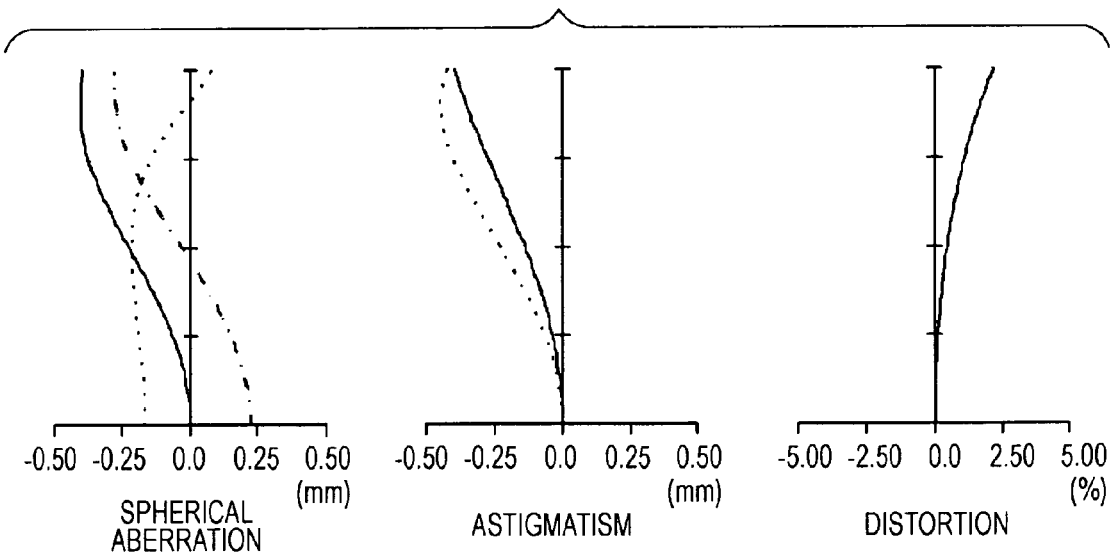
FIG. 3 is a schematic diagram illustrating various aberrations of the numerical example 1, at unity magnification focusing time, of the image capture lens according to the first embodiment.

Next, FIG. 2 shows various aberrations of the image capture lens 1 in numerical example 1 at infinity focusing time. FIG. 3 shows various aberrations at unity magnification focusing time. In the spherical aberrations in FIGS. 2 and 3, the vertical axis represents the ratio of spherical aberration to a full-aperture F value, the horizontal axis represents focus, a solid line represents spherical aberration at d-line (λ=587.6 nm), a dashed line represents spherical aberration at g-line (λ=435.84 nm), and a dot-dashed line represents spherical aberration at c-line (λ=656.28 nm).

Also, in the astigmatism of FIGS. 2 and 3, the vertical axis represents image height, the horizontal axis represents focus, a solid line represents a sagittal image surface, and a dashed line represents a meridional image surface. Further, in the distortion of FIGS. 2 and 3, the vertical axis represents image height, and the horizontal axis represents expansion rate (%) of distortion.

2. Second Embodiment

Figure 4:
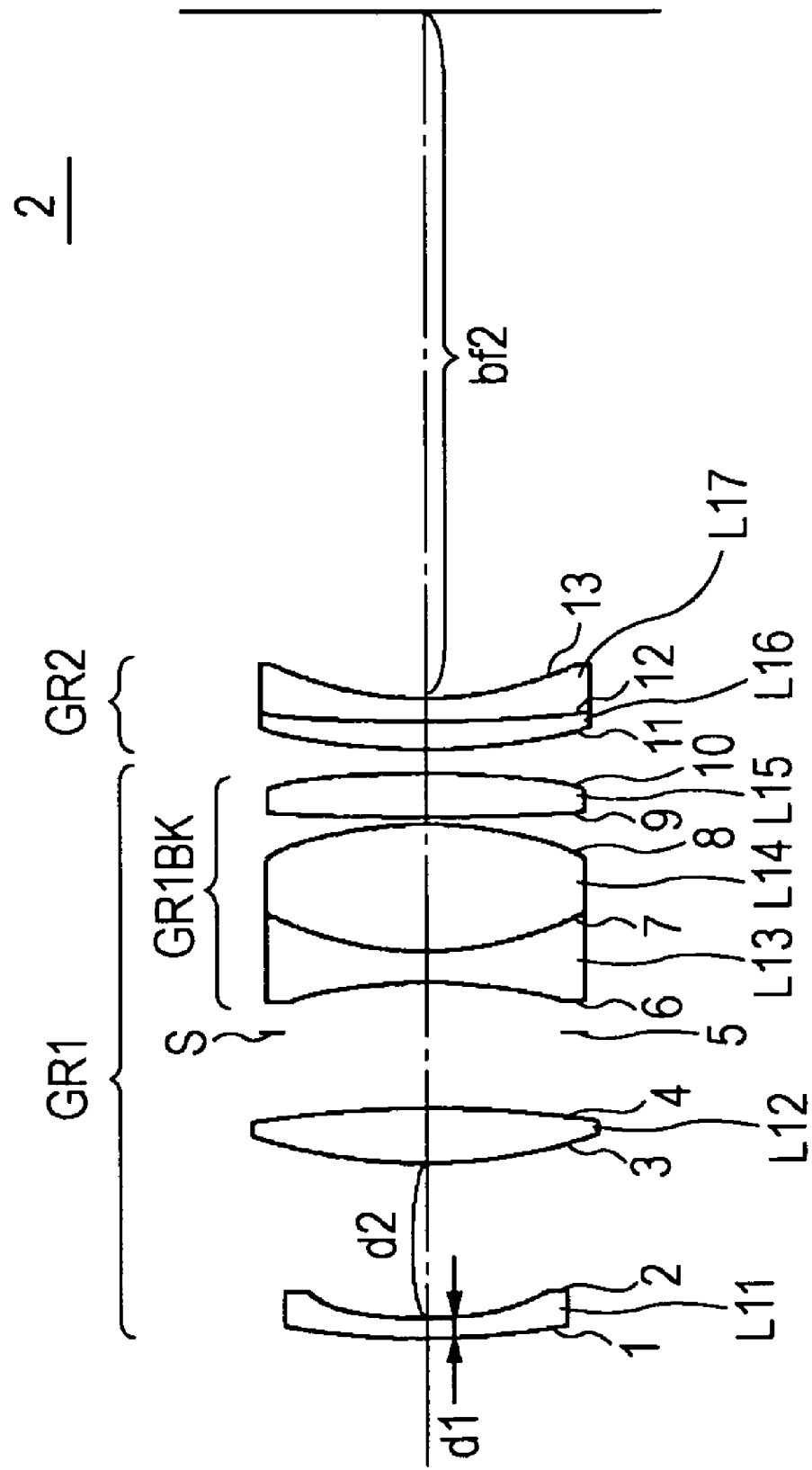
FIG. 4 is a schematic sectional view illustrating a second configuration of an image capture lens according to a second embodiment.

In FIG. 4, reference numeral 2 denotes a retrofocus image capture lens (macro lens) according to a second embodiment as a whole. The image capture lens includes, in order from an object side, a first lens group GR1, which is movable along an optical axis and has positive refractive power, and a fixed second lens group GR2 having negative refractive power.

In the image capture lens 2, focusing is performed by moving the first lens group GR1 along the optical axis. When focusing is changed from infinity focusing to close-up focusing, the first lens group GR1 having positive refractive power is moved from an image surface side to the object side.

That is to say, the image capture lens 2 employs an asymmetric (retrofocus) lens system in which the first lens group GR1, which is near to the object side, is moved along the optical axis, whereas the second lens group GR2, which is near to the image side, is fixed. Thereby, it is possible to make the back focus longer than a focal length of the total lens system.

The first lens group GR1 includes, in order from the object side, a first lens L11, which is a meniscus lens with negative refractive power and has a convex surface facing to the object side, a second lens L12 having positive refractive power, and a rear group GR1BK of the first lens group including a third lens L13 with negative refractive power and having a concave surface facing to the object side with sandwiching an aperture S.

The rear group GR1BK of the first lens group includes the third lens L13 having negative refractive power, a fourth lens L14 cemented with the third lens L13 and having positive refracting power, and a fifth lens L15 having positive refracting power.

The second lens group GR2 is fixed at that position, and includes a sixth lens L16 having positive refracting power, and a seventh lens L17, which is cemented with the sixth lens L16, and has negative refractive power and a strong concave surface facing to the image side.

In the image capture lens 2, the negative first lens L11 having the convex surface facing to the object side of the first lens group GR1 has a strong concave surface facing to the image side, and thus the amount of change in the spherical aberration becomes small with respect to a change in the incident light height to the first lens L11 from infinity shooting time to close-up shooting time. Thereby, in the image capture lens 2, fluctuations of spherical aberration of the first lens group GR1 are made small from infinity shooting time to close-up shooting time.

At the same time, in the image capture lens 2, the second lens group GR2 is fixed relatively to the image surface, and thus an amount of generated spherical aberration is substantially constant from infinity shooting time to close-up shooting time. As described above, fluctuations of spherical aberration of the first lens group GR1 are made small from infinity shooting time to close-up shooting time, and thus fluctuations of spherical aberration of the total lens system are made small.

Also, the second lens group GR2 includes the seventh lens L17 having a strong concave surface facing to the image surface, and thus the second lens group GR2 generates strong positive distortion. Thereby, the image capture lens 2 corrects negative distortion generated by the negative first lens L11 having the convex surface facing to the object side of the first lens group GR1, and thus distortion of the total lens system are made small.

In this manner, with the same lens element configuration as that of the image capture lens 1 according to the first embodiment, the image capture lens 2 is allowed to ensure sufficient back focus bf2 even though the focal length is kept small. Also, the image capture lens 2 has a simple structure in which only the first lens group GR1 is moved while the second lens group GR2 is fixed. Accordingly, it becomes possible to simplify a displacing mechanism, and thus to reduce load at focusing time.

Table 2 shows various specification values of a numerical example 2, in which specific values are applied to the first lens L11 and the second lens L12 in the first lens group GR1 of the image capture lens 2, the third lens L13, the fourth lens L14 and the fifth lens L15 in the rear group GR1BK of the first lens group, and the sixth lens L16 and the seventh lens L17 in the second lens group GR2.

TABLE 2

SPECIFICATIONS OF NUMERICAL EXAMPLE 2
FNo. = 2.879 f = 32.94 ω = 23.56°

| SURFACE No. | R | d | nd | vd |
| --- | --- | --- | --- | --- |
| 1 | 56.25692 | 1.1 | 1.90366 | 31.32 |
| 2 | 13.69081 | 7.4 | | |
| 3 | 21.77197 | 3.8 | 1.80518 | 25.46 |
| 4 | −42.19922 | 4.6 | | |
| 5 | APERTURE | 3.75 | | |
| 6 | −15.88471 | 1.0 | 1.92286 | 20.88 |
| 7 | 24.86621 | 5.9 | 1.48449 | 70.44 |
| 8 | −19.67172 | 0.3 | | |
| 9 | 119.69735 | 2.8 | 1.90366 | 31.32 |
| 10 | −43.16307 | 1.6~21.6 | | |
| 11 | 37.98243 | 2.0 | 1.84666 | 23.78 |
| 12 | 109.00939 | 1.1 | 1.68893 | 31.16 |
| 13 | 20.07396 | | | |

In Table 2, Fno. denotes an F-number, f denotes a focal length, ω denotes a half angle of view. Also, Surface No. denotes the i-th surface from the object side, R denotes a radius of curvature of the i-th surface, d denotes a distance between lens surfaces, nd denotes refractive power of a glass member having the i-th surface at the object side with respect to d-line, and νd denotes an Abbe number of a glass member having the i-th surface at the object side with respect to the d-line. In a place where the distance d between surfaces changes by focusing, the values are shown in order of infinity focusing and unity magnification focusing.

Figure 5:
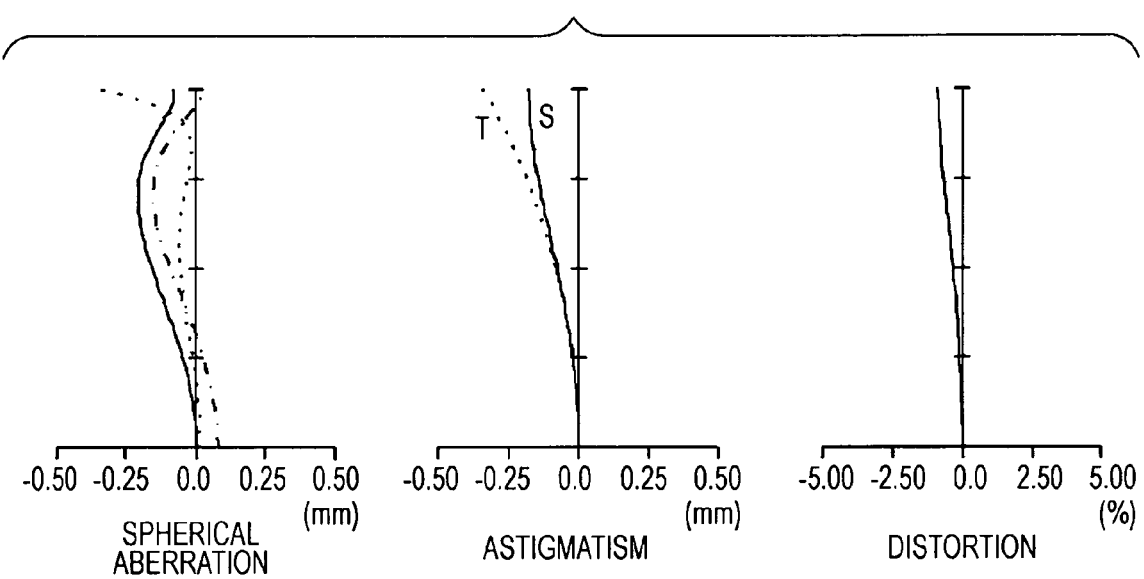
FIG. 5 is a schematic diagram illustrating various aberrations of a numerical example 2, at infinity focusing time, of the image capture lens according to the second embodiment.
Figure 6:
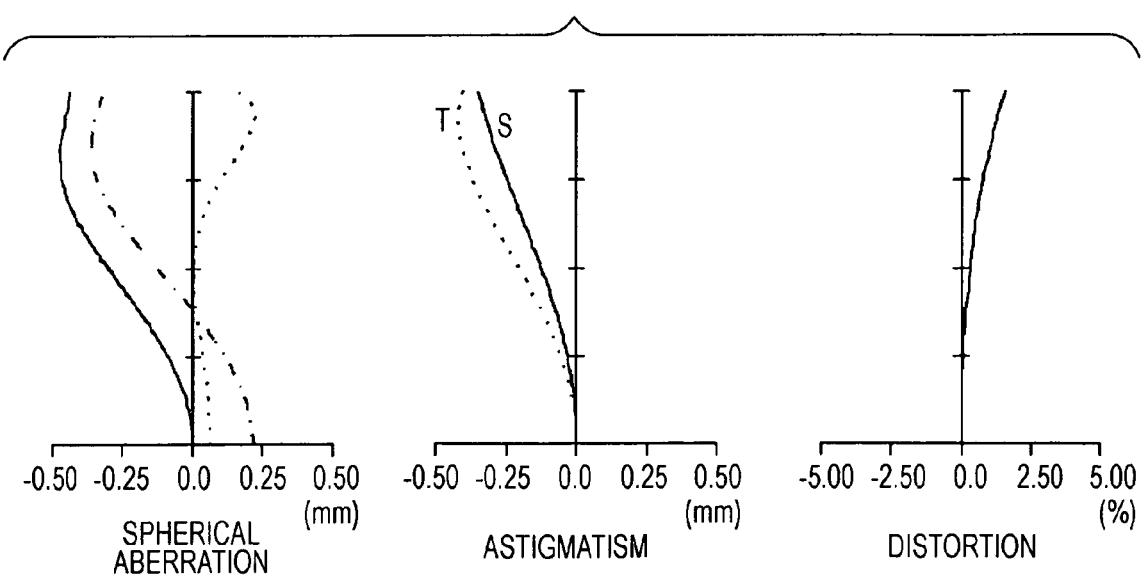
FIG. 6 is a schematic diagram illustrating various aberrations of the numerical example 2, at unity magnification focusing time, of the image capture lens according to the second embodiment.

Next, FIG. 5 shows various aberrations of the image capture lens 2 in numerical example 2 at infinity focusing time. FIG. 6 shows various aberrations at unity magnification focusing time. In the spherical aberrations in FIGS. 5 and 6, the vertical axis represents the ratio of spherical aberration to a full-aperture F value, the horizontal axis represents focus, a solid line represents spherical aberration at d-line ($\lambda$=587.6 nm), a dashed line represents spherical aberration at g-line ($\lambda$=435.84 nm), and a dot-dashed line represents spherical aberration at c-line ($\lambda$=656.28 nm).

Also, in the astigmatism in FIGS. 5 and 6, the vertical axis represents image height, the horizontal axis represents focus, a solid line represents a sagittal image surface, and a dashed line represents a meridional image surface. Further, in the distortion in FIGS. 5 and 6, the vertical axis represents image height, and the horizontal axis represents expansion rate (%) of distortion.

3. Third Embodiment

Figure 7:
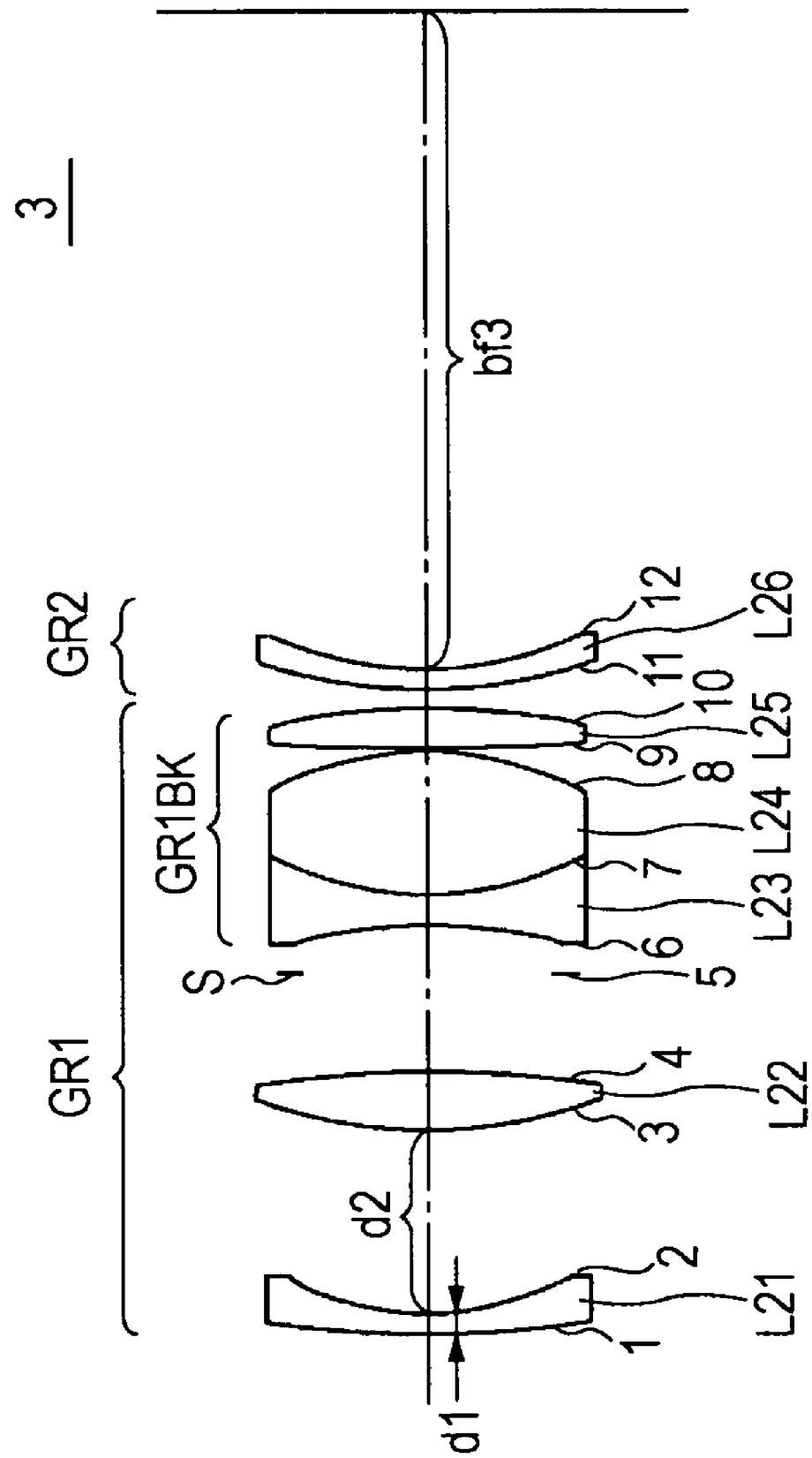
FIG. 7 is a schematic sectional view illustrating a configuration of an image capture lens according to a third embodiment.

In FIG. 7, reference numeral 3 denotes a retrofocus image capture lens (macro lens) according to a third embodiment as a whole. The image capture lens 3 includes, in order from an object side, a first lens group GR1, which is movable along an optical axis and has positive refractive power, and a fixed second lens group GR2 having negative refractive power.

In the image capture lens 3, focusing is performed by moving the first lens group GR1 along the optical axis. When focusing is changed from infinity focusing to close-up focusing, the first lens group GR1 having positive refractive power is moved from an image surface side to the object side.

That is to say, the image capture lens 3 employs an asymmetric (retrofocus) lens system in which the first lens group GR1, which is near to the object side, is moved along the optical axis, whereas the second lens group GR2, which is near to the image side, is fixed. Thereby, it is possible to make the back focus longer than a focal length of the total lens system.

The first lens group GR1 includes, in order from the object side, a first lens L21, which is a meniscus lens with negative refractive power and has a convex surface facing to the object side, a second lens L22 having positive refractive power, and a rear group GR1BK of the first lens group including a third lens L23 with negative refractive power and having a concave surface facing to the object side with sandwiching an aperture S.

The rear group GR1BK of the first lens group includes the third lens L23 having negative refractive power, a fourth lens L24 cemented with the third lens L23 and having positive refracting power, and a fifth lens L25 having positive refracting power.

The second lens group GR2 is fixed at that position, and includes only a sixth lens L26 having positive refracting power. In this point, the second lens group GR2 according to the third embodiment has a different lens configuration from those of the second lens group GR2 of the image capture lens 1 according to the first embodiment and of the second lens group GR2 of the image capture lens 2 according to the second embodiment.

Accordingly, in the image capture lens 3, since the second lens group GR2 includes only the sixth lens L26 having positive refracting power, the image capture lens 3 is allowed to have more improvements in weight saving and portability than the image capture lens 1 according to the first embodiment and the image capture lens 2 according to the second embodiment.

In the image capture lens 3, the negative first lens L21 having the convex surface facing to the object side of the first lens group GR1 has a strong concave surface facing to the image side, and thus the amount of change in the spherical aberration becomes small with respect to a change in the incident light height to the first lens L21 from infinity shooting time to close-up shooting time. Thereby, in the image capture lens 3, fluctuations of spherical aberration of the first lens group GR1 are made small from infinity shooting time to close-up shooting time.

At the same time, in the image capture lens 3, the second lens group GR2 is fixed relatively to the image surface, and thus an amount of generated spherical aberration is substantially constant from infinity shooting time to close-up shooting time. As described above, fluctuations of spherical aberration of the first lens group GR1 are made small from infinity shooting time to close-up shooting time, and thus fluctuations of spherical aberration of the total lens system are made small.

Also, the second lens group GR2 includes the sixth lens L26 having a strong concave surface facing to the image surface, and thus the second lens group GR2 generates strong positive distortion. Thereby, the image capture lens 3 corrects negative distortion generated by the negative first lens L21 having the convex surface facing to the object side of the first lens group GR1, and thus distortion of the total lens system are made small.

In this manner, with the lens element configuration as described above, the image capture lens 3 is allowed to ensure sufficient back focus bf3 even though the focal length is kept small. Also, the image capture lens 3 has a simple structure in which only the first lens group GR1 is moved while the second lens group GR2 is fixed. Accordingly, it becomes possible to simplify a displacing mechanism, and thus to reduce load at focusing time.

Table 3 shows various specification values of a numerical example 3, in which specific values are applied to the first lens L21 and the second lens L22 in the first lens group GR1 of the image capture lens 3, the third lens L23, the fourth lens L24 and the fifth lens L25 in the rear group GR1BK of the first lens group, and the sixth lens L26 in the second lens group GR2.

TABLE 3

SPECIFICATIONS OF NUMERICAL EXAMPLE 3
FNo. = 2.860 f = 30.93 ω = 25.13°

| SURFACE No. | R | d | nd | vd |
|---|---|---|---|---|
| 1 | 65.86204 | 1.2 | 1.83400 | 37.34 |
| 2 | 14.55324 | 11.0 | | |
| 3 | 24.78001 | 3.5 | 1.80610 | 33.27 |
| 4 | −47.00947 | 6.107 | | |
| 5 | APERTURE | 3.188 | | |
| 6 | −18.91282 | 2.0 | 1.84666 | 23.78 |
| 7 | 19.46251 | 8.216 | 1.51680 | 64.20 |
| 8 | −18.30615 | 0.3 | | |
| 9 | 69.20480 | 2.3 | 1.80610 | 33.27 |

TABLE 3-continued

SPECIFICATIONS OF NUMERICAL EXAMPLE 3
FNo. = 2.860 f = 30.93 ω = 25.13°

| SURFACE No. | R | d | nd | vd |
|---|---|---|---|---|
| 10 | −44.07049 | 1.2~21.2 | | |
| 11 | 25.44836 | 1.2 | 1.51680 | 64.20 |
| 12 | 19.12989 | 1.1 | | 31.16 |

In Table 3, Fno. denotes an F-number, f denotes a focal length, ω denotes a half angle of view. Also, Surface No. denotes the i-th surface from the object side, R denotes a radius of curvature of the i-th surface, d denotes a distance between lens surfaces, nd denotes refractive power of a glass member having the i-th surface at the object side with respect to d-line, and vd denotes an Abbe number of a glass member having the i-th surface at the object side with respect to the d-line. In a place where the distance d between surfaces changes by focusing, the values are shown in order of infinity focusing and unity magnification focusing.

Figure 8:
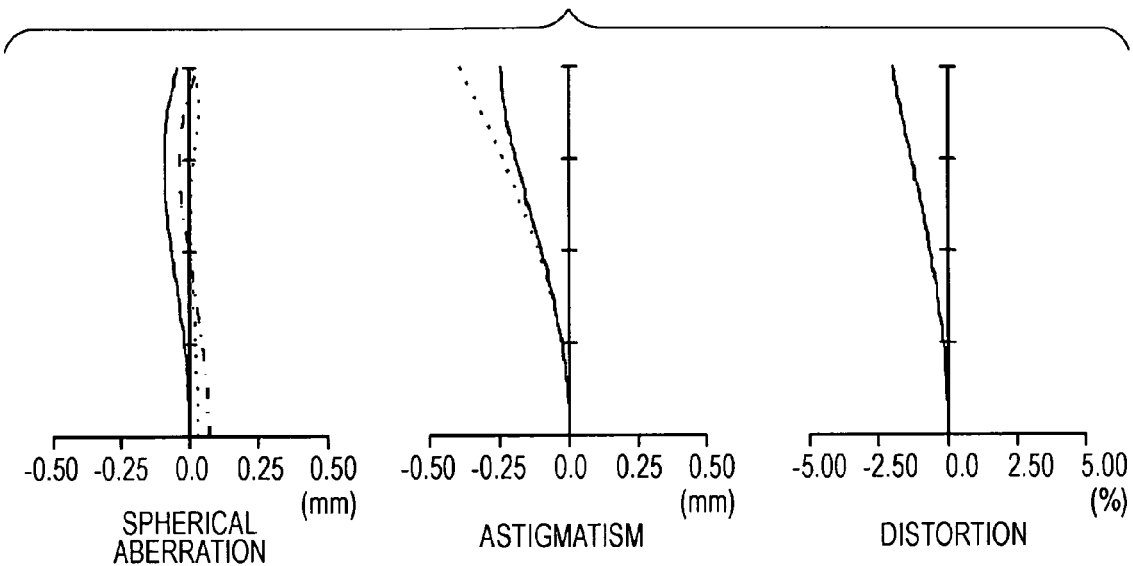
FIG. 8 is a schematic diagram illustrating various aberrations of a numerical example 3, at infinity focusing time, of the image capture lens according to the third embodiment.
Figure 9:
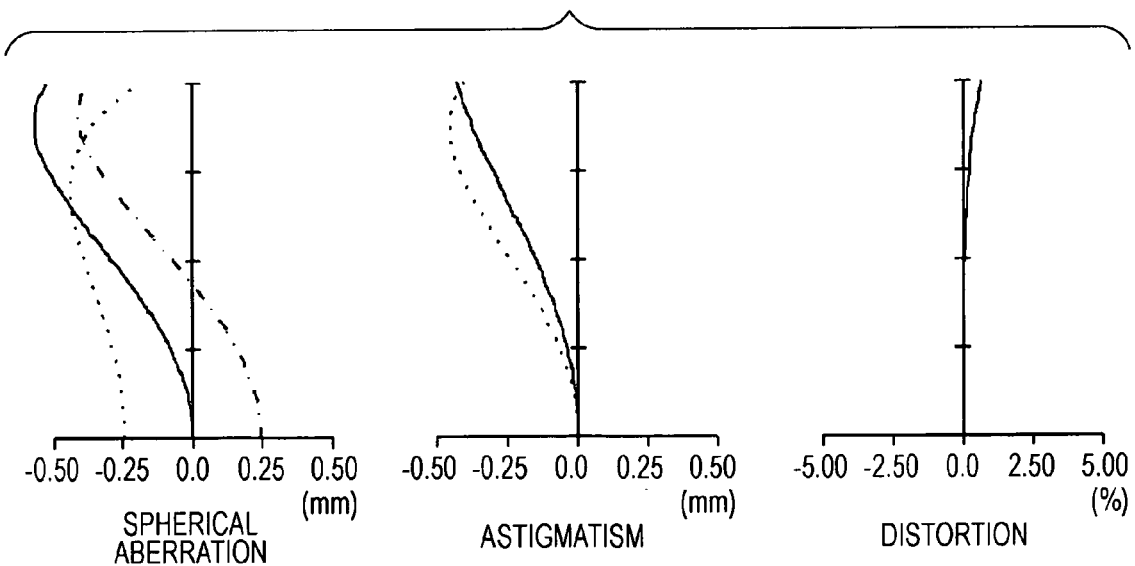
FIG. 9 is a schematic diagram illustrating various aberrations of the numerical example 3, at unity magnification focusing time, of the image capture lens according to the third embodiment.

Next, FIG. 8 shows various aberrations of the image capture lens 3 in numerical example 3 at infinity focusing time. FIG. 9 shows various aberrations at unity magnification focusing time. In the spherical aberrations in FIGS. 8 and 9, the vertical axis represents the ratio of spherical aberration to a full-aperture F value, the horizontal axis represents focus, a solid line represents spherical aberration at d-line (λ=587.6 nm), a dashed line represents spherical aberration at g-line (λ=435.84 nm), and a dot-dashed line represents spherical aberration at c-line (λ=656.28 nm).

Also, in the astigmatism of FIGS. 8 and 9, the vertical axis represents image height, the horizontal axis represents focus, a solid line represents a sagittal image surface, and a dashed line represents a meridional image surface. Further, in the distortion of FIGS. 8 and 9, the vertical axis represents image height, and the horizontal axis represents an expansion rate (%) of distortion.

4. Numeric Value Range Based on Numerical Examples

Next, Table 4 shows values corresponding to the conditional expressions (1) to (3) on the basis of the numerical example 1 of the image capture lens 1 according to the first embodiment to the numerical example 3 of the image capture lens 3 according to the third embodiment.

TABLE 4

| | NUMERICAL EXAMPLE 1 | NUMERICAL EXAMPLE 2 | NUMERICAL EXAMPLE 3 |
|---|---|---|---|
| CONDITIONAL EXPRESSION (1): f1/fi | 0.746 | 0.782 | 0.810 |
| CONDITIONAL EXPRESSION (2): bf/fi | 1.103 | 1.208 | 1.328 |
| CONDITIONAL EXPRESSION (3): Rf2/Rr2 | 0.740 | 0.687 | 0.761 |

Conditional Expression $0.7 < f1/fi < 0.9 \ldots$ (1)
Conditional Expression $1.0 < bf/fi < 1.4 \ldots$ (2)
Conditional Expression $0.5 < Rf2/Rr2 < 1 \ldots$ (3)
where
fi: focal length of the overall lens system
f1: focal length of the first lens group
bf: back focus of the overall lens system
Rf2: radius of curvature of the image side surface of the lens disposed at the nearest side to the object of the first lens group
Rr2: radius of curvature of the surface nearest to the image side of the second lens group.

The conditional expression (1) specifies a lateral magnification of the second lens group GR2, which is a rear group, in order to control a displacement of the first lens group GR1, which is a front group. If the magnification is less than the lower limit, the focal length of the first lens group GR1 becomes too short, and thus it becomes not possible to ensure sufficient back focus bf. Also, fluctuations of spherical aberration with respect to a change in a subject distance becomes large, and thus imaging performance in close region deteriorates. On the other hand, if the magnification is greater than the upper limit, the displacement of the first lens group GR1 becomes large, and thus it becomes difficult to miniaturize the barrel.

Also, the conditional expression (2) specifies the ratio of the amount of back focus bf to the focal length. If the ratio is less than the lower limit, the focal length of the total lens system at infinity focusing time becomes long, and a displacement of the first lens group GR1 at close focusing time becomes large, and thus miniaturization becomes difficult. On the other hand, if the ratio is greater than the upper limit, negative refractive power of the first lens L1, L11, and L21 in the first lens group GR1 becomes strong, and thus fluctuations of spherical aberration with respect to a change in a subject distance becomes large. Accordingly, imaging performance in close region deteriorates.

Further, the conditional expression (3) specifies the ratio between a radius of curvature of a surface facing to the image side of the negative first lens L1, L11, and L21 located nearest to the object in the first lens group GR1 and a radius of curvature of a surface nearest to the image in the second lens group GR2. If the ratio is less than the lower limit, the negative refractive power of the first lens L1, L11, and L21 in the first lens group GR1 becomes strong, and thus fluctuations of spherical aberration with respect to a change in a subject distance becomes large. On the other hand, if the ratio is greater than the upper limit, correction of the curvature of the image surface by the surface nearest to the image side in the second lens group GR2 becomes weak, and thus the positive curvature of the image surface at close focusing time on the subject becomes strong.

Thus, as is apparent from Table 4, the corresponding values on the basis of the numerical example 1 of the image capture lens 1 to the numerical example 3 of the image capture lens 3 satisfy all of the conditional expressions (1) to (3).

Specifically, the corresponding value "0.746" of the numerical example 1, the corresponding value "0.782" of the numerical example 2, and the corresponding value "0.810" of the numerical example 3 all satisfy the conditional expression (1).

Also, the corresponding value "1.103" of the numerical example 1, the corresponding value "1.208" of the numerical example 2, and the corresponding value "1.328" of the numerical example 3 all satisfy the conditional expression (2).

Further, the corresponding value "0.740" of the numerical example 1, the corresponding value "0.687" of the numerical example 2, and the corresponding value "0.761" of the numerical example 3 all satisfy the conditional expression (3).

In this regard, as shown in FIGS. 2, 3, 5, 6, 8, and 9, it is understood that in the numerical example 1 of the image capture lens 1 to the numerical example 3 of the image capture lens 3, the individual aberrations are corrected in a balanced manner both at infinity focusing time and at unity magnification focusing time.

Accordingly, the image capture lens 1 according to the first embodiment to the image capture lens 3 according to the third embodiment have the lens elements having the configurations described above. As shown in the numerical example 1 to the numerical example 3, by satisfying the conditional expressions (1) to (3), each of the image capture lenses has a relatively short focal length compared to the back focus, and can employ a barrel structure with a short total lens length by reducing a displacement of the first lens group while having excellent optical performance in a wide range of shooting distance from infinity to unity magnification.

5. Configuration of Image Capture Apparatus

Figure 10:
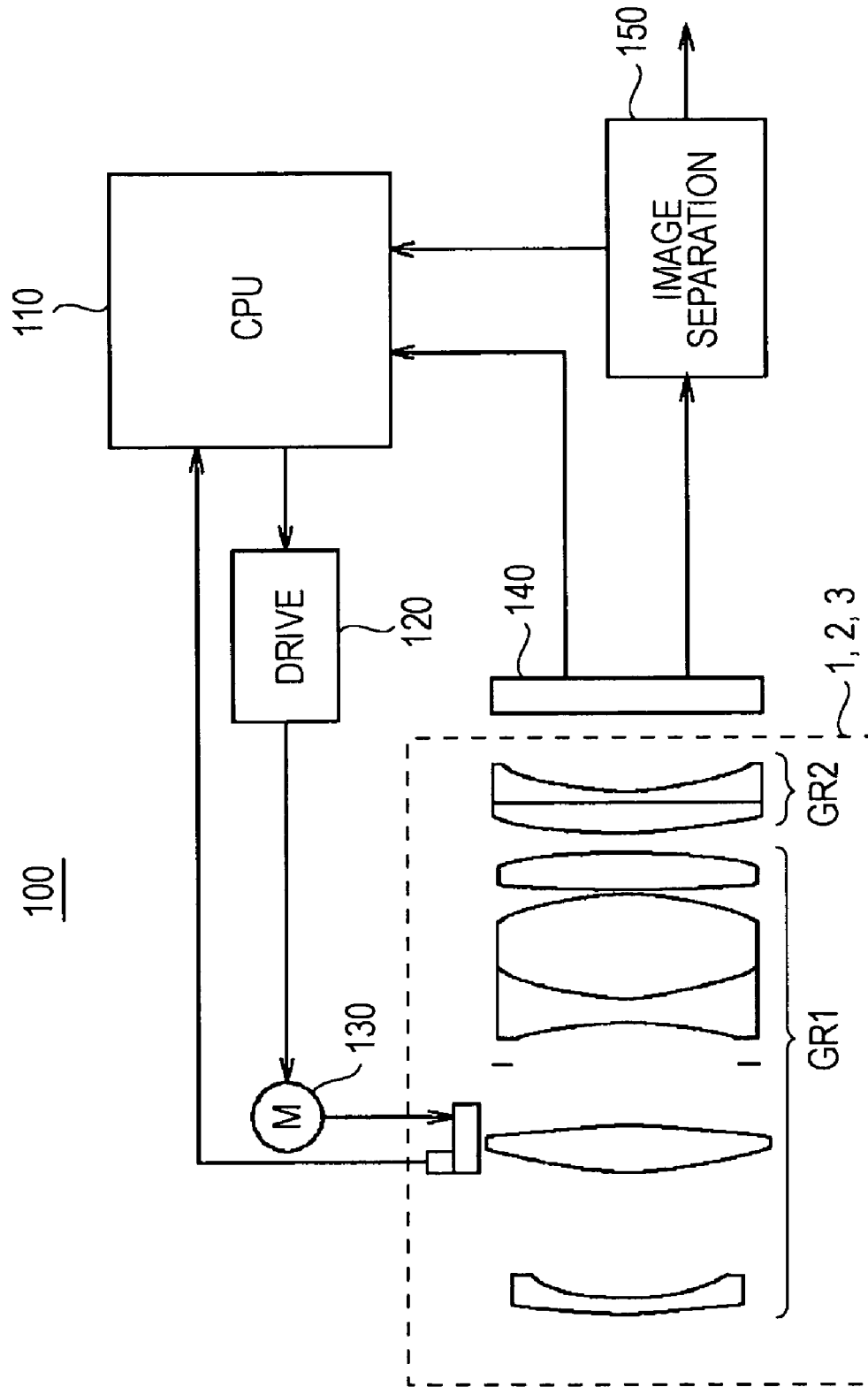
FIG. 10 is a schematic block diagram illustrating a configuration of an image capture apparatus according to the present invention.

Next, referring to FIG. 10, a description will be given of a configuration of an image capture apparatus 100 using each of the above-described image capture lenses 1 to 3.

The image capture apparatus 100 is, for example, a digital still camera. A CPU (Central Processing Unit) 110 totally controls the overall apparatus, converts an optical image obtained by the above-described image capture lens 1 (2, 3) into an electrical signal by an imaging device 140, and then outputs the signal to an image separation circuit 150.

Here, for the imaging device 140, a photoelectric conversion element, such as a CCD (Charge Coupled Device), a CMOS (Complementary Metal-Oxide Semiconductor), etc., for example, is used.

The image separation circuit 150 generates a focus control signal on the basis of the electrical signal, outputs this signal to the CPU 110, and outputs the image signal corresponding to an image portion of the electrical signal to an image processing circuit (not shown in the figure) in the subsequent stage.

The image processing circuit converts the received signal into a signal having a format suitable for the subsequent processing. The converted signal is supplied for image display processing in a display section, recording processing on a predetermined recording medium, data transfer processing through a predetermined communication interface, and the like.

The CPU 110 receives an operation signal of a focusing operation, etc., supplied from the outside, and performs various processing in accordance with the operation signal. For example, when a zooming operation signal based on a zoom button is supplied, the CPU 110 operates a drive motor 130 through a drive circuit 120 in order to go into a state having a focal length in accordance with the instruction.

Thereby, the CPU 110 of the image capture apparatus 100 moves the first lens group GR1 of the image capture lens 1 along an optical axis in accordance with the focusing operation signal. In this regard, positional information of the first lens group GR1 at that time is fed back to the CPU 110 of the image capture apparatus 100, and the CPU 110 refers to the information when moving the first lens group GR1 through the drive motor 130 next time.

In this regard, in the image capture apparatus 100, only one drive system is shown for the sake of simplicity. However, the image capture apparatus 100 may be provided with drive systems individually for a zoom system, a focus system, a shooting-mode change system, etc. Also, if a function of correcting camera shake is provided, the image capture apparatus 100 may includes an anti-vibration drive system for driving shake correction lens (group). Also, some of the above-described drive systems may be provided in common.

6. Other Embodiment

In this regard, in the above-described embodiments, descriptions have been given of the cases having specific shapes, structures, and numeric values as shown in Tables 1 to 3, which are corresponding to the numerical example 1 in the first embodiment to the numerical example 3 in the third embodiment, respectively. However, the present invention is not limited to the above. The present invention may be applied to the cases having the other various shapes, structures, and numeric values as far as the conditional expressions (1) to (3) are satisfied.

Also, in the above-described embodiments, descriptions have been given of the cases where specific applications of the image capture apparatus 100 are assumed to be a digital camera. However, the present invention is not limited to this. Specific applications of the image capture apparatus 100 may include various kinds of electronic apparatuses, such as a cellular phone including a digital still camera, a digital video camera, etc., a PDA (Personal Digital Assistant), and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image capture lens comprising:
   when focus is changed from infinity focusing to close focusing, a first lens group moving from an image surface side to an object side and having positive refractive power; and
   a second lens group fixed relatively to the image surface and having negative refractive power,
   wherein the first lens group includes a negative first lens having a strong concave surface facing to the image side at a nearest side to the object,
   the second lens group includes one negative lens having a strong concave surface facing to the image side or a negative cemented lens including a positive lens and a negative lens, and
   the image capture lens satisfies conditional expressions (1), (2), and (3);

$$0.7 < f1/fi < 0.9 \tag{1}$$

$$1.0 < bf/fi < 1.4 \tag{2}$$

$$0.5 < Rf2/Rr2 < 1 \tag{3}$$

where fi is a focal length of the overall lens system, f1 is a focal length of the first lens group, bf is a back focus of the overall lens system, Rf2 is a radius of curvature of the image side surface of the lens disposed at the nearest side to the object of the first lens group, and Rr2 is a radius of curvature of the surface nearest to the image side of the second lens group.

2. The image capture lens according to claim 1,
wherein the first lens group includes, in order from the object side, the first lens being a negative meniscus lens having a convex surface facing to the object side, a second lens being a positive lens, and a negative lens having a concave surface facing to the object side with sandwiching an aperture.

3. An image capture apparatus comprising:

an image capture lens; and an imaging device converting an optical image formed by the image capture lens into an electrical signal, wherein the image capture lens includes;

when focus is changed from infinity focusing to close focusing, a first lens group moving from an image surface side to an object side and having positive refractive power; and a second lens group fixed relatively to the image surface and having negative refractive power, wherein the first lens group includes a negative first lens having a strong concave surface facing to the image side at a nearest side to the object, the second lens group includes one negative lens having a strong concave surface facing to the image side or a negative cemented lens including a positive lens and a negative lens, and the image capture lens satisfies conditional expressions (1), (2), and (3);

$$0.7 < f1/fi < 0.9 \quad (1)$$

$$1.0 < bf/fi < 1.4 \quad (2)$$

$$0.5 < Rf2/Rr2 < 1 \quad (3)$$

where fi is a focal length of the overall lens system, f1 is a focal length of the first lens group, bf is a back focus of the overall lens system, Rf2 is a radius of curvature of the image side surface of the lens disposed at the nearest side to the object of the first lens group, and Rr2 is a radius of curvature of the surface nearest to the image side of the second lens group.

4. The image capture apparatus according to claim 3,
wherein the first lens group includes, in order from the object side, the first lens being a negative meniscus lens having a convex surface facing to the object side, a second lens being a positive lens, and a negative lens having a concave surface facing to the object side with sandwiching an aperture.

* * * * *